(12) United States Patent
Hanneder et al.

(10) Patent No.: US 12,455,008 B2
(45) Date of Patent: Oct. 28, 2025

(54) SHIFT DEVICE

(71) Applicant: ArvinMeritor Technology, LLC, Troy, MI (US)

(72) Inventors: Michael Hanneder, Troy, MI (US); Johannes Bernoegger, Troy, MI (US); Silvia Grünwald, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 18/628,255

(22) Filed: Apr. 5, 2024

(65) Prior Publication Data

US 2024/0376979 A1    Nov. 14, 2024

(30) Foreign Application Priority Data

May 9, 2023   (EP) .................................. 23172173

(51) Int. Cl.
*F16H 63/32*      (2006.01)
*F16H 63/30*      (2006.01)

(52) U.S. Cl.
CPC ...... *F16H 63/32* (2013.01); *F16H 2063/3076* (2013.01); *F16H 2063/3089* (2013.01)

(58) Field of Classification Search
CPC .............. Y10T 74/20183; F16H 63/32; F16H 2063/3076; F16H 2063/3089; F16H 63/30; F16H 2063/321
USPC ......................................... 74/473.36, 473.37
See application file for complete search history.

(56) References Cited

U.S. PATENT DOCUMENTS

| | | | | |
|---|---|---|---|---|
| 1,898,190 | A * | 2/1933 | Kohler | F16H 63/30 |
| | | | | 192/48.91 |
| 5,517,876 | A * | 5/1996 | Genise | F16H 63/304 |
| | | | | 192/109 A |
| 6,619,153 | B2 * | 9/2003 | Smith | F16H 63/32 |
| | | | | 74/337.5 |
| 10,808,768 | B2 * | 10/2020 | Creech | F16H 63/32 |

FOREIGN PATENT DOCUMENTS

| | | |
|---|---|---|
| DE | 10359092 A1 | 7/2005 |
| DE | 102005040485 B4 | 11/2018 |
| FR | 3123959 A1 | 12/2022 |

OTHER PUBLICATIONS

Extended European Search Report dated Oct. 16, 2023 for related European Appln. No. 23172173.9, 7 pages.

* cited by examiner

*Primary Examiner* — Victor L Macarthur
(74) *Attorney, Agent, or Firm* — Brooks Kushman PC

(57) ABSTRACT

A shift device is provided. The shift device comprises a first member axially movably supported on a shaft, a second member axially movably supported on the shaft, and an elastic member arranged on the shaft and elastically compressible in the axial direction of the shaft. The second member is engaged with the first member such that an axial movement of the first member is transmitted to the second member and vice versa via the elastic member.

13 Claims, 3 Drawing Sheets

SHIFT DEVICE

CROSS-REFERENCE TO RELATED APPLICATIONS

This application claims the benefit of European patent application no. 23172173.9, filed May 9, 2023, the disclosure of which is hereby incorporated in its entirety by reference herein.

TECHNICAL FIELD

The present invention relates to a shift device, and in particular to a shift device for a shifting system.

BACKGROUND

In, for example, a vehicle transmission with an electrically actuated shifting system, it is important to prevent overloading of an actuator that performs a shift operation. To do this, conventionally, a shift device including a spring system is used. The spring system temporarily compensates for a shifting movement caused upon operation of the actuator, when a shift sleeve configured to engage and disengage gears of the transmission with a transmission shaft (e.g., a sliding collar or a dog clutch) is prevented from shifting during an engagement process with a corresponding gear, for example, due to a tooth-to-tooth position with the gear, or during a disengagement process with the gear, for example, due to torque still acting on the engagement between the shift sleeve and the gear. That is, even if the shifting of the shift sleeve is temporarily prevented, the actuator is allowed to complete the shifting movement and an overload of the actuator during the shift operation can be avoided. As a result, the spring system can prevent damage to the actuator and help prevent a reduction in its service life.

Conventionally, as shown in FIG. 3, the shift device including the spring system uses two springs 301, 302 (so-called blocker springs). When the actuator is operated and moves a first member 100 supported on a shaft 400 in a first axial direction A1 (e.g., to the left in FIG. 3), the movement is transmitted via the first spring 301 to a second member 200 supported on the shaft 400 and in communication with the shift sleeve. By compressing the first spring 301 in the axial direction, the spring system can temporarily compensate for the shifting movement, when the shifting of the shift sleeve is prevented, for example, due to tooth-to-tooth position with the gear. As a result, relative axial movement between the first and the second members 100, 200 occurs. When the tooth-to-tooth position with the gear is released, the first spring 301, being compressed, exerts an urging force (due to the elastic restoring force) on the first and second members 100, 200, which moves the second member 200 in the first axial direction A1 and completes the shifting of the shift sleeve. When the actuator is operated and moves the first member 100 into a second axial direction A2 (e.g., to the right in FIG. 3) opposite to the first axial direction A1, the corresponding effect is achieved by the compression of the second spring 302.

However, the conventional design of the shift device including the spring system is associated with disadvantages. Firstly, depending on the relative axial movement toward the first or the second axial direction A2, the elastic restoring force of either the first spring 301 or of the second spring 302 is applied. Consequently, the neutral position of the first member 100 with respect to the second member 200 is influenced by any difference in spring forces of the first and second springs 301, 302. Therefore, positional accuracy of the first member 100 with respect to the second member 200 is not sufficiently ensured, which may affect the shifting accuracy of the shift device. Furthermore, the requirements for the manufacturing tolerances of the springs 301, 302 are very high. Additionally, by sequentially arranging the first and second springs 301, 302 in the axial direction, an axial length of the spring system cannot be reduced without affecting the possible compensation distance for the axial movement. This conflicts with the generally desired goal of reducing the space required to be installed.

Therefore, there is a need for a compactly designed shift device including a spring system that provides improved shifting accuracy.

In view of the above, it is the object of the present invention to provide a compactly designed shift device that provides improved shifting accuracy.

SUMMARY

The object is achieved by a shift device having the features of independent claim 1. A shifting system including the shift device according to the invention is subject matter of claim 10. Further advantageous developments are set out in the dependent claims.

According to the invention, the axial movement of a first member supported on a shaft is transmitted to a second member supported on the shaft and vice versa via an elastic member. By compression of the elastic member, a relative axial movement between the first member and the second member is allowed in both the first axial direction and the second axial direction opposite to the first axial direction. That is, when the first member is axially moved relative to the second member in the first axial direction, the elastic member is compressed, and the elastic restoring force of the elastic member urges the first member back to its initial position relative to the second member. When the first member is moved axially relative to the second member in the second axial direction, also in this case, the elastic member is compressed and the elastic restoring force of the elastic member urges the first member back to its initial position relative to the second member.

Therefore, in the shift device according to the invention, regardless of whether a relative axial movement occurs between the first and the second members in the first or second axial direction, the elastic restoring force of the same elastic member is applied. As a result, it is ensured that the initial position of the first member relative to the second member, in particular a neutral position of the shift device, is always in the same position. Therefore, the positional accuracy of the shift device can be ensured, resulting in excellent shifting accuracy of the shift device.

The elastic member compensates for the relative axial movement between the first and the second member in both the first and the second axial directions. Therefore, an installation space required for the spring system can be reduced.

Optionally, the shift device may further include two inner sleeves, which are axially movably supported on the shaft. In addition, the first member may comprise an outer sleeve, which is disposed radially outwardly of the inner sleeves. The outer sleeve may be axially movably supported on the shaft via the two inner sleeves. The elastic member may be arranged between the two inner sleeves.

Accordingly, the two inner sleeves may serve as bearing portions for the first member including the outer sleeve. The two inner sleeves are spaced apart by the elastic member arranged between the two inner sleeves. As a result, an excellent bearing of the first member on the shaft can be ensured despite the reduced installation space required for the spring system of the shift device. Therefore, tilting of the first member (and thus, jamming of the sleeve on the shaft) can be effectively prevented.

Optionally, the inner sleeve may have an outer abutment projecting radially outwardly from an outer peripheral surface of the inner sleeve. The outer sleeve may have, at each axial end, an inner abutment projecting radially inwardly from an inner peripheral surface of the outer sleeve. An axial movement of the inner sleeve relative to the outer sleeve towards a position, in which the inner sleeve protrudes from the outer sleeve, is restricted by the outer abutment of the inner sleeve abutting the inner abutment of the outer sleeve. In addition, the elastic member may be disposed radially inside the outer sleeve so as to urge the outer abutments of the inner sleeves into contact with the inner abutments of the outer sleeve. Therefore, as long as the elastic resilient force of the elastic member is high enough to urge the outer abutments of the inner sleeves into contact with the inner abutments of the outer sleeve, the initial position (i.e., the neutral position) of the first member is dependent only on the geometrical dimensions of the inner sleeves and the outer sleeve. Thus, the influence of fluctuations of elastic characteristics of the elastic member on the initial position of the first member can be suppressed. As a result, excellent shifting accuracy of the shift device can be achieved while simultaneously achieving a reduced required installation space for the spring system of the shift device.

Optionally, the second member may include first and second bearing portions for axially movably supporting the second member on the shaft. The outer sleeve of the first member accommodating the elastic member, and the inner sleeves may be interposed between the first and second bearing portions of the second member. As a result, an excellent bearing of the second member on the shaft can be ensured while simultaneously achieving a reduced required installation space for the spring system of the shift device. Therefore, tilting of the second member can be effectively prevented.

Optionally, when the first member is in the initial position relative to the second member, one of the inner sleeves may abut the first bearing portion and the other of the inner sleeves may abut the second bearing portion. Therefore, the initial position (i.e., the neutral position) of the first member relative to the second member is dependent only on the geometrical dimensions of the inner sleeves, the outer sleeve of the first member and the bearing portions of the second member. Thus, the influence of fluctuations of elastic characteristics of the elastic member on the initial position of the first member relative to the second member can be suppressed. As a result, excellent shifting accuracy of the shift device can be achieved.

Optionally, the inner sleeve may include an axial protrusion partially covering an outer peripheral surface of an axial end portion of the elastic member. Therefore, the elastic member can be centered via the axial protrusion of the inner sleeve. Hence, centering or guiding of the elastic member via the shaft is not necessary. As a result, friction between the elastic member and the shaft can be reduced.

Optionally, an inner peripheral surface of the inner abutments of the outer sleeve of the first member may slidably contact the outer peripheral surface of the inner sleeve. Therefore, when the first member is displaced from the initial position relative to the second member, an excellent guidance and support of the first member moving axially relative to the second member can be achieved.

Optionally, the elastic member may include at least a first coil spring and a second coil spring arranged on a radially outer side of the first coil spring so as to circumferentially surround the first coil spring. As a result, depending on the purpose of use, various elastic characteristics can be appropriately chosen. In addition, compared to the use of only one coil spring, higher elastic restoring forces can be achieved.

Further benefits and advantages of the present invention will become apparent from the following detailed description of at least one exemplary embodiment for carrying out the present invention with reference to the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A first embodiment of the present invention is described below with reference to FIG. 1.

Figure 1:
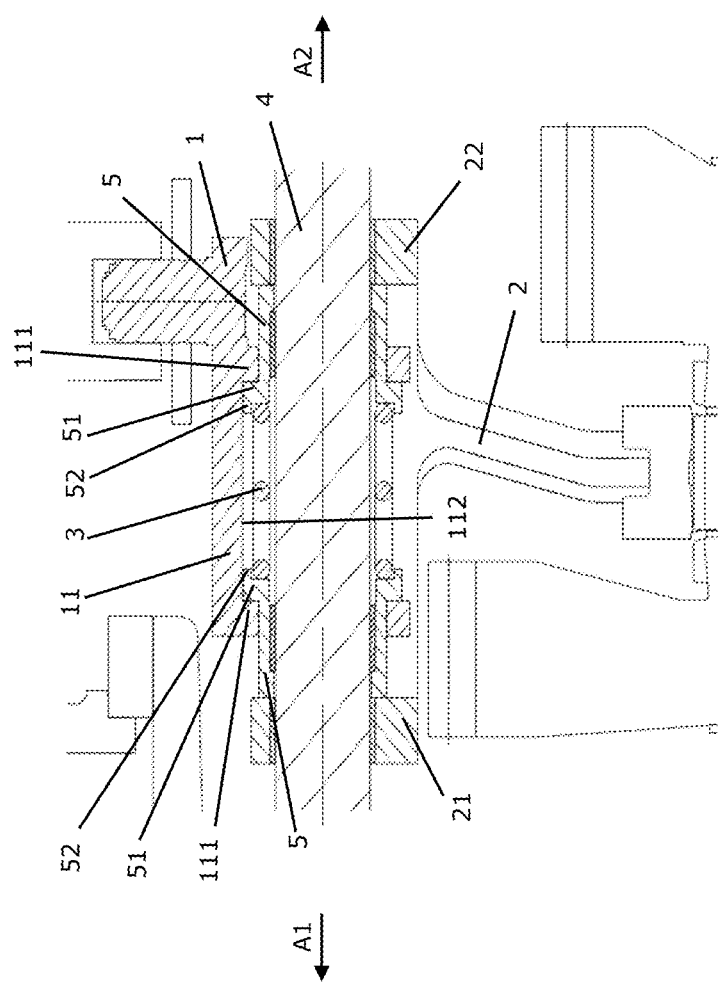
FIG. 1 is a schematic sectional view of a shift device according to a first embodiment of the present invention.

FIG. 1 illustrates a schematic sectional view of the shift device according to the first embodiment. The shift device allows a relative axial movement between a first member 1 and a second member 2 and provides an elastic restoration to the initial position. In the first embodiment, the shift device is exemplified for the use in an electrically actuated shifting system. However, the shift device according to the invention is not limited to the use in the electrically actuated shifting system. In particular, the shift device according to the invention can be implemented in various fields, where a relative movement between two members and an elastic restoration to the initial position is required.

The shift device includes the first member 1, which is axially movably supported on a shaft 4. The first member 1 is in communication with an actuator of the shifting system (not shown) via a coupling mechanism, so that when the actuator is actuated, the first member 1 is shifted in the axial direction of the shaft 4. Depending on the control of the actuator, an axial movement of the first member 1 can be made in one axial direction (a first axial direction A1) or the other axial direction (a second axial direction A2) opposite to the first axial direction A1.

The first member 1 comprises an outer sleeve 11. The outer sleeve 11 is disposed so as to surround the shaft 4 at least partially in the circumferential direction. That is, the outer sleeve 11 may have a partially opened circumferential portion. At each axial end portion of the outer sleeve 11, an inner abutment 111 is formed by a protrusion projecting radially inwardly from an inner peripheral surface 112 of the outer sleeve 11. The inner abutments 111 extend in a circumferential direction of the outer sleeve 11.

The first member 1 further comprises a coupling portion for coupling with the coupling mechanism. As shown in FIG. 1, the coupling portion is formed on an axial end portion (on the right end portion in FIG. 1). However, the design of the coupling portion is not limited to this and can be appropriately provided, e.g., on an axial central portion of the outer sleeve 11.

The shift device further includes two inner sleeves 5, which are axially movably supported on the shaft 4. The inner sleeves 5 are disposed so as to surround the shaft 4 at least partially in the circumferential direction. The inner sleeves 5 are disposed radially inwardly with respect to the outer sleeve 11. In particular, a diameter of an outer peripheral surface of the inner sleeves 5 is smaller than a diameter of an inner peripheral surface 112 of the outer sleeve 11.

Furthermore, one of the two inner sleeves 5 is axially arranged such that one axial end portion of the inner sleeve 5 is disposed inside the outer sleeve 11. That is, one of the axial end portions of the outer sleeve 11 radially overlaps with the axial end portion of the inner sleeve 5 disposed inside the outer sleeve 11. Correspondingly, also the other of the two inner sleeves 5 is axially arranged such that one axial end portion of the inner sleeve 5 is disposed inside the outer sleeve 11. That is, the other of the axial end portions of the outer sleeve 11 radially overlaps with the axial end portion of the other of the inner sleeve 5 disposed inside the outer sleeve 11. The axial end portions of the inner sleeves 5, which are not disposed inside the outer sleeve 11, protrude from the outer sleeve 11 in the axial direction.

As mentioned above, the outer sleeve 11 is axially movably supported on the shaft 4. This support is provided via the two inner sleeves 5. In particular, an inner peripheral surface of the inner abutments 111 of the outer sleeve 11 slidably contacts the outer peripheral surface of the respective inner sleeve 5. Therefore, the inner sleeves 5 are axially movable with respect to the outer sleeve 11.

An outer abutment 51 is formed on each of the inner sleeves 5 at the axial end portion disposed inside the outer sleeve 11. The outer abutment 51 projects radially outwardly from the outer peripheral surface of the inner sleeve 5 and extends in the circumferential direction of the inner sleeve 5. An outer diameter of the outer abutment 51 of the inner sleeve 5 is larger than an inner diameter of the inner abutment 111 of the outer sleeve 1. Therefore, when the inner sleeve 5 is axially moved relative to the outer sleeve 11 in the axial direction, in which the inner sleeve protrudes from the outer sleeve, the outer abutment 51 of the inner sleeve 5 engages with the respective inner abutment 111 of the outer sleeve 11, thereby restricting the axial movement of the inner sleeve 5 relative to the outer sleeve 11.

An axial protrusion 52 is formed on an outer circumferential edge portion of the outer abutment 51 on an axial end side of the inner sleeve 5. The axial protrusion 52 partially covers an outer peripheral surface of an axial end portion of an elastic member 3 described below.

The shift device further comprises an elastic member 3. According to the first embodiment shown in FIG. 1, a coil spring is used as the elastic member 3. However, the present invention is not limited thereto. For example, plate springs or rubber members can be used as the elastic member 3. The elastic member 3 is elastically compressible in the axial direction.

The elastic member 3 is arranged concentrically around the shaft 4 so as to be axially aligned with the shaft 4. The elastic member 3 is arranged radially inside of the outer sleeve 11 of the first member 1. Furthermore, the elastic member 3 is arranged between the two inner sleeves 5 with respect to the axial direction. The elastic member 3 urges the two inner sleeves 5 in the direction in which the respective inner sleeve 5 protrudes out of the outer sleeve 11. That is, the elastic member 3 (i.e., an elastic restoring force) urges the outer abutments 51 of the inner sleeves 5 into contact with the respective inner abutment 111 of the outer sleeve 11. Furthermore, by compression of the elastic member 3, the inner sleeves 5 can be axially moved with respect to the outer sleeve 11 in a direction opposite to the direction in which the respective inner sleeve 5 protrudes out of the outer sleeve 11.

Outer peripheral surfaces of the axial end portions of the elastic members 3 are at least partially covered by the axial protrusion 52 of the inner sleeve 5. The axial protrusions 52 serve for axial centering of the elastic member 3.

The shift device includes the second member 2, which is axially movably supported on the shaft 4. The second member 2 is in communication with a shift member of the shifting system, such as a shift fork and/or a shift sleeve (e.g., a sliding collar or a dog clutch). The second member 2 includes a first bearing portion 21 and a second bearing portion 22. The first and second bearing portions 21, 22 serve for axially movably supporting the second member 2 on the shaft 4. In particular, the first and second bearing portions 21, 22 are formed substantially in a ring shape coaxially arranged with the shaft 4.

The first bearing portion 21 and the second bearing portion 22 are spaced apart from each other in the axial direction. The outer sleeve 11 of the first member 1 and the inner sleeves 5 are interposed between the first bearing portion 21 and the second bearing portion 22. In particular, a axial distance from an axial end side of the first bearing portion 21 facing the second bearing portion 22 to an axial end side of the second bearing portion 22 facing the first bearing portion 21 is substantially equal to a distance from an axial end side of one inner sleeve 5 facing the first bearing portion 21 to an axial end side of the other inner sleeve 5 facing the second bearing portion 22, when the outer abutments 51 of the inner sleeves 5 contact the respective inner abutment 111 of the outer sleeve 11. Consequently, in a state, in which the outer abutments 51 of the inner sleeves 5 contact the respective inner abutment 111 of the outer sleeve 11, the axial end side of one inner sleeve 5 contacts the axial end side of the first bearing portion 21 facing the second bearing portion 22, and the axial end side of the other inner sleeve 5 contacts the axial end side of the second bearing portion 22 facing the first bearing portion 22.

In the following, operation of the shift device according to the first embodiment of the present invention is described with reference to FIG. 1.

In the shift device according to the first embodiment described above, the second member 2 is engaged with the first member 1 such that an axial movement of the first member 1 is transmitted to the second member 2 via the elastic member 3. In particular, when the first member 1 is moved axially toward the first axial direction A1 (e.g., to the left in FIG. 1) upon operation of the actuator of the shifting system, the axial movement of the first member 1 is transmitted to one of the two inner sleeves 5 (e.g., the right inner sleeve 5 in FIG. 1) via the engagement of the inner abutment 111 of the outer sleeve 11 with the outer abutment 51 of the inner sleeve 5. The axial movement of the one inner sleeve 5 is transmitted to the other inner sleeve 5 (e.g., the left inner sleeve 5 in FIG. 1) via the elastic member 3. The axial movement of the other inner sleeve 5 is transmitted to the second member 2 via one of the first and second bearing portions 21, 22 (e.g., the first bearing portion 21) being in contact with the other inner sleeve 5. As a result, the second member 22 axially moves the shift member and, for example, a shift sleeve connected to the shift member is engaged with a gear of a manual transmission.

In the shifting process described above, the first member 1 and the second member 2 both move axially with respect to the shaft. That is, the first member 1 does not move axially relative to the second member 2. Thus, the first member 1 remains in an initial position (i.e., a neutral position) relative to the second member 2, as it is shown in FIG. 1.

In the following, the shifting process is described for a situation when the axial movement of the shift member of the shifting system is restricted, for example, due to a tooth-to-tooth position with the gear.

Initially, the axial movement is transmitted from the first element 1 to the second element 2 as described above. However, when the axial movement of the shift member connected to the second member 2 is restricted, the axial movement of the second member 2 is also restricted. As a result, the axial movement of the inner sleeve 5, which is provided on the axial end side of the outer sleeve 11 facing in the axial moving direction of the first member 1, is restricted by contacting one of the first and second bearing portions 21, 22 of the second member 2. The inner sleeve 5, which is provided on the axial end side of the outer sleeve 11 facing opposite to the axial moving direction of the first member 1, is still moved axially by the engagement of the outer abutment 52 with the inner abutment 111 of the outer sleeve 11. Therefore, the elastic member 3 is compressed between the two inner sleeves 5. As a result, the first member 1 moves axially while the second member 2 does not move axially. That is, the first member 1 is moved axially relative to the second member 2 and deviates from its initial position relative to the second member 2.

When the first member 1 is moved in the first axial direction A1 relative to the second member 2, the inner sleeve 5 provided on the axial end side of the outer sleeve 11 in the first axial direction A1 is displaced relative to the outer sleeve 11 so as to space the outer abutment 51 from the respective inner abutment 111. The inner sleeve 5 provided on the axial end side of the outer sleeve 11 in the second axial direction A2 is displaced from the second bearing portion 22 so as to space the inner sleeve 5 from the second bearing portion 22.

Correspondingly, when the first member 1 is moved in the second axial direction A2 relative to the second member 2, the inner sleeve 5 provided on the axial end side of the outer sleeve 11 in the second axial direction A2 is displaced relative to the outer sleeve 11 so as to space the outer abutment 51 from the respective inner abutment 111. The inner sleeve 5 provided on the axial end side of the outer sleeve 11 in the first axial direction A1 is displaced from the first bearing portion 21 so as to space the inner sleeve 5 from the second bearing portion 21.

Therefore, the elastic member 3, by being compressed, allows relative axial movement in both the first axial direction A1 and the opposite second axial direction A2 between the first member 1 and the second member 2 so that one of the first member 1 and the second member 2 is displaced from an initial position relative to the other of the first member and the second member 2.

The elastic member 3 is appropriately adapted to compensate for the relative axial movement of the first member 1 with respect to the second member 2 without interrupting the operation of the actuator before the intended end position is reached. Typical dimensions for the axial movement during the shifting process (i.e., a specific amount) are, for example, about 11 mm. Therefore, the elastic member 3 is designed to be compressible by at least about 11 mm (i.e., the specific amount) when the elastic member 3 is arranged inside the outer sleeve 11 and between the two inner sleeves 5 (i.e., in an installed state). The tooth-to-tooth position occurs, for example, after an axial movement of about 2 mm. Consequently, the elastic member 3 is able to compensate for the relative movement between the first member 1 and the second member 2, which is, for example, approximately 9 mm.

When the restriction on the axial movement of the shift member is released (e.g., the tooth-to-tooth position is released), the elastic restoring force of the elastic member 3 urges the first member 1 in the second axial direction A2 and the second member 2 in the first axial direction A1 (according to the above-described example). Consequently, the second member 2 is axially moved, thereby axially moving the shift member so as to complete the shifting process of the shift member.

In particular, the elastic restoring force of the elastic member 3 ensures that the first member 1 is moved axially to its initial position relative to the second member 2, when the axial movement of the second member 2 (i.e., the shift member) is no longer restricted. Thus, after the restriction of the axial movement is removed, the shift device returns to the initial position described above.

According to the first embodiment of the present invention, the first member 1 communicates with the actuator of the shifting system and the second member 2 communicates with the shift member of the shifting system. However, the first embodiment can be modified so that the second member 2 communicates with the actuator and the first member 1 communicates with the shift member. This arrangement also provides the same effects and advantages as the first embodiment.

Figure 2:
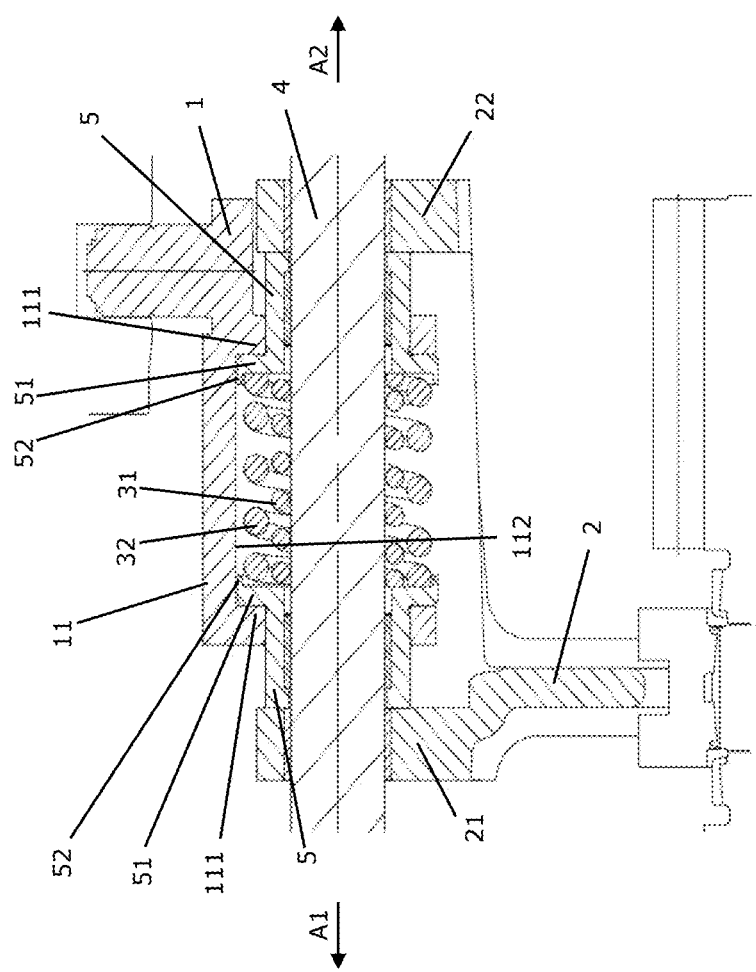
FIG. 2 is a schematic sectional view of a shift device according to a second embodiment of the present invention.
Figure 3:
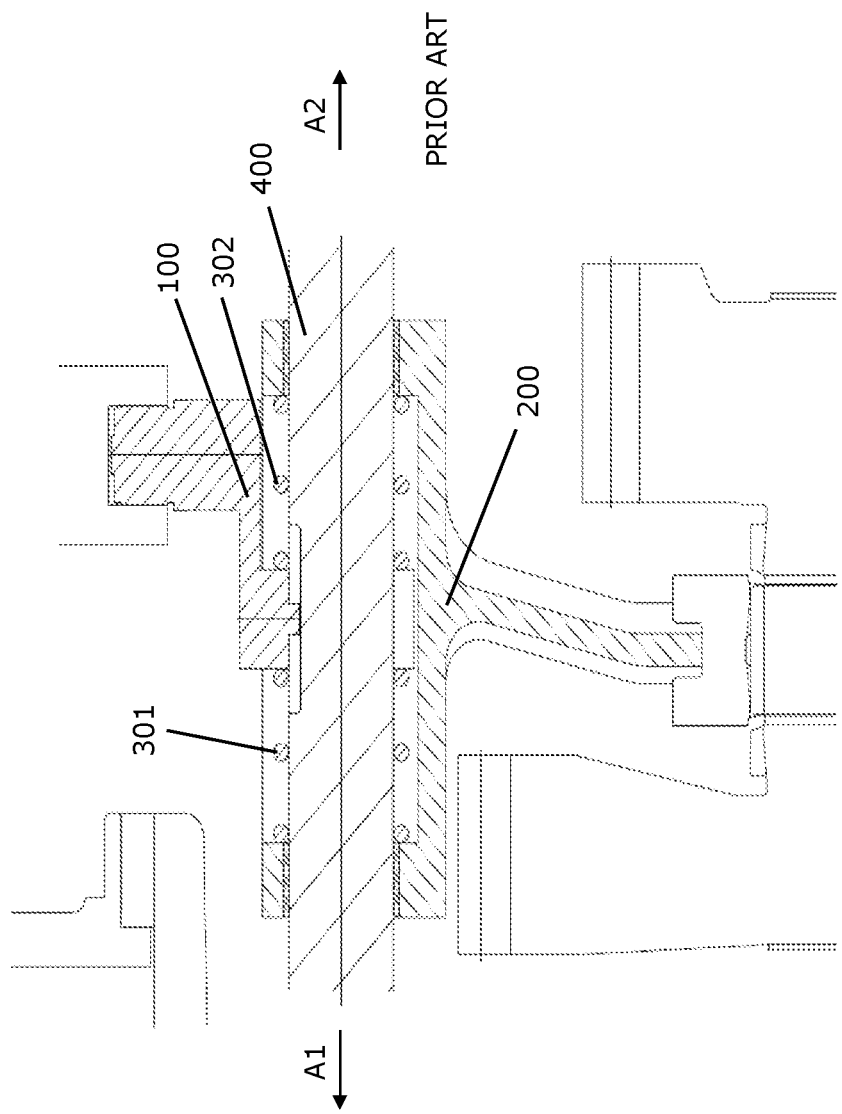
FIG. 3 is a schematic sectional view of a conventional shift device.

A second embodiment of the present invention is described below with reference to FIG. 2.

The second embodiment differs from the first embodiment in that the elastic member 3 comprises a first coil spring 31 and a second coil spring 32. The second coil spring 32 is arranged on a radially outer side of the first coil spring 32. The first coil spring 31 and the second coil spring 32 are arranged axially aligned with the shaft 4. The first coil spring 31 and the second coil spring 32 are axially arranged between the two inner sleeves 5 and radially inside of the outer sleeve 5.

By providing of the first coil spring 31 and the second coil spring 32, higher elastic restoring forces can be achieved compared to using only one coil spring. In addition, the same effects and advantages can be achieved as with the first embodiment.

The above-described embodiments of the present invention can be appropriately modified or combined. The above description is not exhaustive, and the present invention is not limited to the above embodiments. The skilled person will recognize that various modifications and combinations of the features included in the above embodiments are possible within the scope of the invention. Accordingly, the scope of the invention should be determined from the accompanying claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A shift device, comprising:
a first member axially movably supported on a shaft, the first member comprising a coupling portion for coupling with a coupling mechanism which is in communication with an actuator of a shifting system;
a second member axially movably supported on the shaft, and
an elastic member arranged on the shaft and elastically compressible in an axial direction of the shaft, wherein
the second member is engaged with the first member such that an axial movement of the first member is transmitted to the second member and vice versa via the elastic member,
the elastic member, by being compressed, allows relative axial movement in both a first axial direction and an opposite second axial direction between the first member and the second member so that one of the first member and the second member is displaced from an initial position relative to the other of the first member and the second member, and
the elastic member, in a compressed state, exerts an urging force on the first member and the second member urging the one of the first member and the second member towards the initial position relative to the other of the first member and the second member;
wherein the shift device further comprises two inner sleeves axially movably supported on the shaft,
the first member comprises an outer sleeve disposed radially outwardly of the inner sleeves,
the outer sleeve is axially movably supported on the shaft via the inner sleeves,
the inner sleeves are axially movable with respect to the outer sleeve, and
the elastic member is arranged axially between the two inner sleeves.

2. The shift device according to claim 1, wherein
one of the two inner sleeves is arranged at one axial end of the outer sleeve at least partially inside the outer sleeve,
the other of the two inner sleeves is arranged at an other axial end of the outer sleeve at least partially inside the outer sleeve,
the inner sleeves each have an axial end, which is arranged inside the outer sleeve, and an outer abutment projects radially outwardly at the axial end from an outer peripheral surface of the inner sleeve and extends in a circumferential direction of the inner sleeve, and
the outer sleeve has at each of the axial ends an inner abutment projecting radially inwardly from an inner peripheral surface of the outer sleeve and extending in a circumferential direction of the outer sleeve, and
the outer abutment of each inner sleeve engages a respective inner abutment of the outer sleeve such that an axial movement of the inner sleeves relative to the outer sleeve is restricted.

3. The shift device according to claim 2, wherein
the elastic member is arranged inside the outer sleeve and urges the inner sleeves in the axial direction towards the respective axial end of the outer sleeve,
when the one of the first member and the second member is in the initial position relative to the other of the first member and the second member, the outer abutments of the inner sleeves abut the respective inner abutment of the outer sleeve, and,
when the one of the first member and the second member is displaced from the initial position relative to the other of the first member and the second member, one of the inner sleeves is displaced relative to the outer sleeve so as to space the outer abutment from the respective inner abutment, thereby compressing the elastic member between the inner sleeves.

4. The shift device according to claim 2, wherein
at least one inner sleeve includes an axial protrusion formed on an outer circumferential edge portion of the outer abutment on an axial end side of the inner sleeve, and
the axial protrusion partially covers an outer peripheral surface of an axial end portion of the elastic member.

5. The shift device according to claim 2, wherein
an inner peripheral surface of the inner abutments of the outer sleeve slidably contacts the outer peripheral surface of the respective inner sleeve.

6. The shift device according to claim 1, wherein
the second member includes a first bearing portion and a second bearing portion for axially movably supporting the second member on the shaft,
the outer sleeve of the first member and the inner sleeves are interposed between the first bearing portion and the second bearing portion,
when the one of the first member and the second member is in the initial position relative to the other of the first member and the second member, one of the inner sleeves abuts the first bearing portion of the second member and the other of the inner sleeves abuts the second bearing portion of the second member, and,
when the one of the first member and the second member is displaced from the initial position relative to the other of the first member and the second member, one of the inner sleeves is displaced from the first or second bearing portion so as to space the respective inner sleeve from the first or second bearing portion, thereby compressing the elastic member between the inner sleeves.

7. The shift device according to claim 1, wherein
the elastic member is a coil spring.

8. The shift device according to claim 7, wherein
the elastic member includes at least a first coil spring and a second coil spring, and
the second coil spring is arranged on a radially outer side of the first coil spring so as to circumferentially surround the first coil spring.

9. A shifting system comprising:
an actuator,
a shift member for shifting a shift sleeve configured to engage and disengage gears of a transmission, and
a shift device that comprises:
a first member axially movably supported on a shaft, the first member comprising a coupling portion for coupling with a coupling mechanism which is in communication with the actuator of the shifting system, a second member axially movably supported on the shaft, and an elastic member arranged on the shaft and elastically compressible in an axial direction of the shaft;

wherein the actuator is in communication with the first member the shift device, and the shift member is in communication with the second member of the shift device, when the actuator is operated, the first member is moved in the axial direction by a specific amount, when axial movement of the shift member is not restricted, the axial movement of the first member is transmitted to the second member so that the second member is moved in the axial direction by the specific amount, when axial movement of the shift member is restricted, the first member is displaced from an initial position relative to the second member, thereby compressing the elastic member, and when restriction on the axial movement of the shift member is released, the elastic member urges the first member to the initial position relative to the one of the first member and the second member, thereby axially moving the shift member by the specific amount so as to perform a shifting operation;

wherein the shift device further comprises two inner sleeves axially movably supported on the shaft, the first member comprises an outer sleeve disposed radially outwardly of the inner sleeves, the outer sleeve is axially movably supported on the shaft via the inner sleeves, the inner sleeves are axially movable with respect to the outer sleeve, and the elastic member is arranged axially between the two inner sleeves.

10. The shifting system according to claim 9, wherein the shift member and the second member are formed integrally.

11. The shifting system according to claim 10, wherein the shift member is a shift fork configured to engage the shift sleeve and reciprocate the shift sleeve in the axial direction.

12. The shifting system according to claim 9, wherein the elastic member is configured to be compressible in an installed state by at least the specific amount.

13. A shift device, comprising:

a first member axially movably supported on a shaft, the first member comprising a coupling portion for coupling with a coupling mechanism which is in communication with an actuator of a shifting system;

a second member axially movably supported on the shaft, and an elastic member arranged on the shaft and elastically compressible in an axial direction of the shaft, wherein the second member is engaged with the first member such that an axial movement of the first member is transmitted to the second member and vice versa via the elastic member, the elastic member, by being compressed, allows relative axial movement in both a first axial direction and an opposite second axial direction between the first member and the second member so that one of the first member and the second member is displaced from an initial position relative to the other of the first member and the second member, and the elastic member, in a compressed state, exerts an urging force on the first member and the second member urging the one of the first member and the second member towards the initial position relative to the other of the first member and the second member, wherein the shift device further comprises two inner sleeves axially movably supported on the shaft, the first member comprises an outer sleeve disposed radially outwardly of the inner sleeves, the outer sleeve is axially movably supported on the shaft via the inner sleeves, the inner sleeves are axially movable with respect to the outer sleeve, and the elastic member is arranged axially between the two inner sleeves wherein one of the two inner sleeves is arranged at one axial end of the outer sleeve at least partially inside the outer sleeve, the other of the two inner sleeves is arranged at an other axial end of the outer sleeve at least partially inside the outer sleeve, the inner sleeves each have an axial end, which is arranged inside the outer sleeve, and an outer abutment projects radially outwardly at the axial end from an outer peripheral surface of the inner sleeve and extends in a circumferential direction of the inner sleeve, and the outer sleeve has at each of the axial ends an inner abutment projecting radially inwardly from an inner peripheral surface of the outer sleeve and extending in a circumferential direction of the outer sleeve, and the outer abutment of each inner sleeve engages a respective inner abutment of the outer sleeve such that an axial movement of the inner sleeves relative to the outer sleeve is restricted, wherein at least one inner sleeve includes an axial protrusion formed on an outer circumferential edge portion of the outer abutment on an axial end side of the inner sleeve, and the axial protrusion partially covers an outer peripheral surface of an axial end portion of the elastic member.

* * * * *